Figure 1:
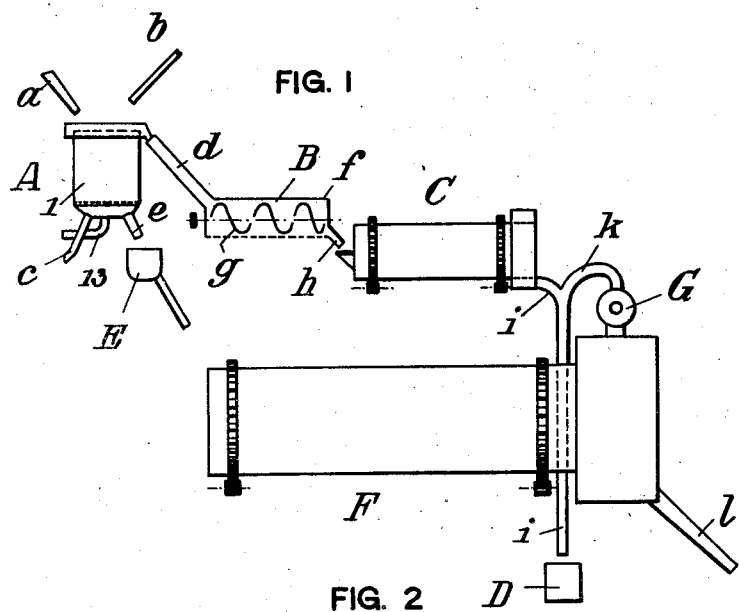

Sept. 13, 1932. P. GROSS 1,877,170
PROCESS FOR OPENING UP OF CEREALS
Filed Dec. 2, 1930 2 Sheets-Sheet 1

Inventor:
Paul Gross
By Harold D. Penney Atty.

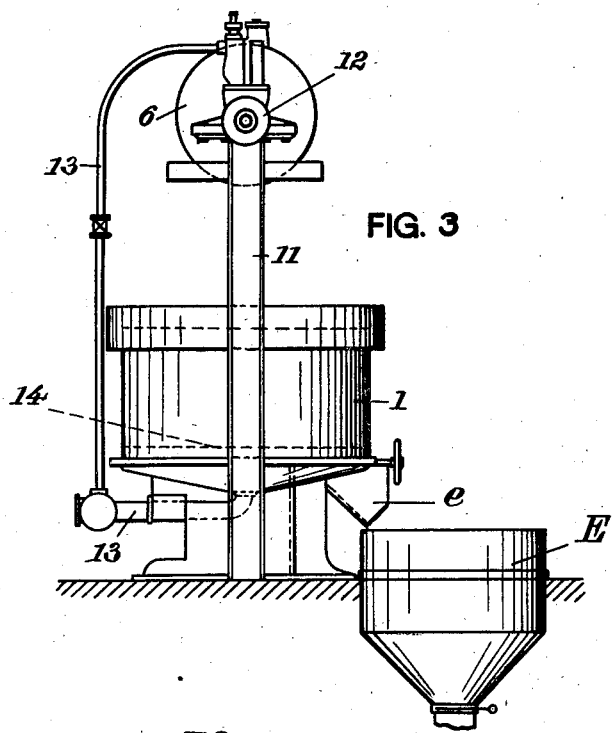
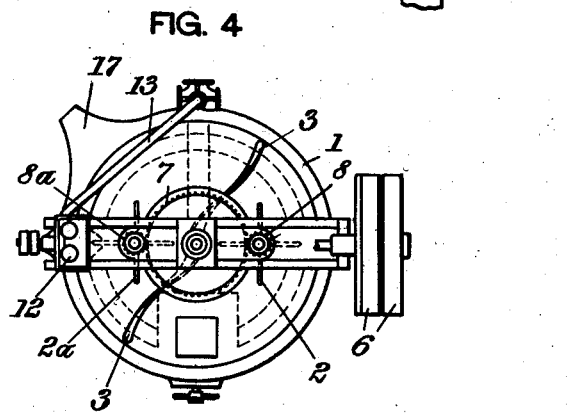

Patented Sept. 13, 1932

1,877,170

UNITED STATES PATENT OFFICE

PAUL GROSS, OF BERLIN-HERMSDORF, GERMANY

PROCESS FOR OPENING UP OF CEREALS

Application filed December 2, 1930, Serial No. 499,440, and in Germany September 21, 1929.

To-day bread cereals generally are still prepared for human consumption in the same manner which has been in use for thousands of years, by subjecting the cereal with or without previous cleaning to a grinding process in which the entire grain, that is including the outer husk of cellulose which is useless for human nourishment, is disintegrated. From the coarse meal thus produced, by separating the bran and other constituents belonging to the more darkly coloured outer layers of the grain the flour is obtained which in the course of years has always had to be made finer and lighter in colour. As is well known these requirements cannot be justified from the dietetic point of view. Modern research in this sphere has shown, moreover, that the very finely ground flours are in nutritive value far behind coarse meal containing all the constituents of the grain, owing to the fact that they contain relatively little of the constituents which are particularly nutritious. Bread baked from coarse meal ground in the usual manner and containing all the constituents of the grain including the outer husk is not suitable for persons having a weak digestion and is in many instances not liked on account of its dark colour. Furthermore, such bread is not used, more particularly as regards its albumen content, to the best advantage by the human digestive organs, the main reason for which is that in the usual grinding process the greater part of the albumen substances and other particularly valuable constituents of the cereal grain adhere to the wood fibre layers of the grain which are entirely indigestible for human beings and are therefore not completely digested.

For this reason many suggestions have been made and carried out, according to which bread and the like is made directly from the wholemeal after the removal of the outer husks forming the bran. With this object in view the cereal is treated after previous wetting or soaking with sharp brushes, emery discs or the like and the corn thus more or less freed from its outer layers is converted by crushing while still soft directly into the bread dough.

It has also been proposed to soak the cereal in water until the flour body assumes a thick porridge-like consistency. The kernel has then to be separated from the husk by crushing. Whether this can be carried out in practice appears to be doubtful. In any case it would be extremely difficult to deal with the porridge-like final product, which would of course have to be first dried, in the normal way, that is to say in the usual mills. If it is at all possible in practice to grind the mass which is in the form of pulp into flour, it would be necessary to provide special arrangements, at least means for producing a preliminary disintegration. In addition to this the transport of the dried mass is by no means as simple as the transport of ordinary cereals. This is of course a great disadvantage for high grade materials in bulk, such as bread cereals.

Another inventor has proposed merely to wet the cereal with water for facilitating the husking operation. The proposed process then requires very powerful mechanical action consisting in treating the only moistened cereal with the aid of a large number of drums having a rough surface and placed one behind the other. This requires a very complicated apparatus. It is even then doubtful whether the grains are actually completely freed from the woody husks and whether through the intensive mechanical treatment by the friction bodies valuable layers of the cells will not be removed as well. At any rate this process has not been adopted in practice.

According to another process the cereal, after being washed, is to be treated in an agitator without water in the absence of air, in such a manner that the grains rub against one another and against the walls of the agitating drum, evolving considerable heat. In a second agitating drum the separated husks are to be drawn off by a fan, while the dehusked grains are to be dried and polished in a third agitating drum. In this process as well the outer ligneous husks cannot be entirely removed without considerably affecting the kernel itself. But this is not the object of the earlier inventor, who intended to do no more than remove the cerealin.

Finally, as a preparatory process for the direct manufacture of bread dough from cereals it has been proposed to steep them in warm water, the quantity of which amounts to about that of the cereal to be treated, and to stir the mass up vigorously by means of an agitating device, when, after continuing this operation for about an hour and a half, the outer seed husks are said to become detached and to form a frothy mass on the surface of the steeping water. After being preliminarily treated in this manner, the cereal which has absorbed the greater part of the steeping water is then to be worked up by means of crushing rolls into a dough of uniform consistency.

All these proposals have not been able to alter the fact that bread cereals are still almost all converted into flour in the old-fashioned way described above. The reason for this is obviously that the known wet husking processes are too inconvenient and take too much time and require a too complicated apparatus which is unsuitable for mass production, and also that the prolonged steeping of the cereal, considered necessary for the complete removal of the ligneous husk, detrimentally affects its nature, more particularly as regards baking, and renders the drying process which follows directly on the husking process more difficult.

The present invention is based on the above-mentioned known preparatory husking process for the direct preparation of dough, in which the cereal to which warm water is added is vigorously stirred up with an agitator. From this known method the method forming the subject matter of the present invention, however, differs considerably in that this treatment, which is preferably carried out with considerably less water, is continued only for a very short time, namely only until the outermost ligneous husks have become loosened without becoming completely detached from the kernels and without the latter swelling in the water. This can be effected in the period of a few minutes. The husking operation is then interrupted, at first only a portion of the loosened husks being separated from the kernels, preferably by being floated away from them, the kernels being thereupon passed through a drier during which the remainder of the husks is removed, preferably by being blown away by means of the drying air.

The husks which have been previously separated by a wet process are separately dried and can then be mixed with those which have separated off in the drier. In this way is obtained on the one hand the kernel which has been completely freed from the ligneous husk and which can be ground to flour in a very simple manner and on the other hand the husks consisting of pure cellulose which can be used with great advantage as the raw material in the cellulose industry.

This new process has a number of advantages from the economic, milling and dietetic point of view, and enables the full value of bread cereals to be realized in a particularly economical manner as shall be more particularly described hereinafter.

In the milling processes as at present carried out, there are obtained, for instance when grinding 100 kg. of rye, the following final products, not taking into account the slight losses occurring in the cleaning process and other waste:

```
65 kg. fine flour     at M 28.—  per 100 kg.=M 18.20
13 kg. coarse flour   at M 25.50 per 100 kg.=M  3.31
22 kg. bran           at M 12.—  per 100 kg.=M  2.64
───                                           ───────
100 kg.                                       M 24.15
```

As compared with this the opening up of the same quantity of corn by the process according to the invention gives

```
84 kg. fine flour     at M 28.—  per 100 kg.=M 23.52
14 kg. wholemeal      at M 28.—  per 100 kg.=M  3.92
 2 kg. cellulose      at M 40.—  per 100 kg.=M  0.80
───                                           ───────
100 kg.                                       M 28.24
```

This represents a gain from the products obtained of more than M 4.— per 100 kg. of rye.

Apart from this considerable gain, the flour obtained, more particularly the fine flour, while being of the same light colour is considerably richer in albumens and vitamins. But more important still the grinding of the kernels which are freed from the husks is considerably easier and simpler. The explanation for this is that the wood fibres of the outer husks of the corn are not carried as theretofore through the whole of the milling process, only the constituents of the corn which are relatively easy to disintegrate and open up being subjected to the grinding process. For this reason a considerably smaller number of sets of millstones and roller mills may be used and the number of passes may be considerably reduced. In other words, mills of a certain output may be made and driven at much lower cost or the output of existing mills may be considerably increased, the material passing, instead of for instance through 12 to 16 mills as hitherto, through only 3 to 4 mills in parallel arrangement.

A further advantage is that when grinding grains which have been first husked according to the new process a smaller roll pressure is required, so that the power required for driving the mills is appreciably reduced. The flour obtained by the new process is also easier to bake. This is probably to be explained by the more gentle treatment due to the fact that the corn can be far more easily disintegrated, coupled with the fact that the ground material becomes less heated. It is generally acknowledged that the frequent poor baking property of flours which are supposed to be of high quality is due to the corn being subjected to too great mechanical and thermal stressing in modern mills with their intensive operation, the so-called grinding to death.

The manner in which the process is carried out in practice shall now be more particularly described with reference to the accompanying drawings, in which Fig. 1 is a diagrammatic representation of the whole arrangement, not showing the grinding apparatus, and Figs. 2, 3 and 4 an apparatus for husking the corn, in elevation from two different sides and in plan view.

Figure 2:
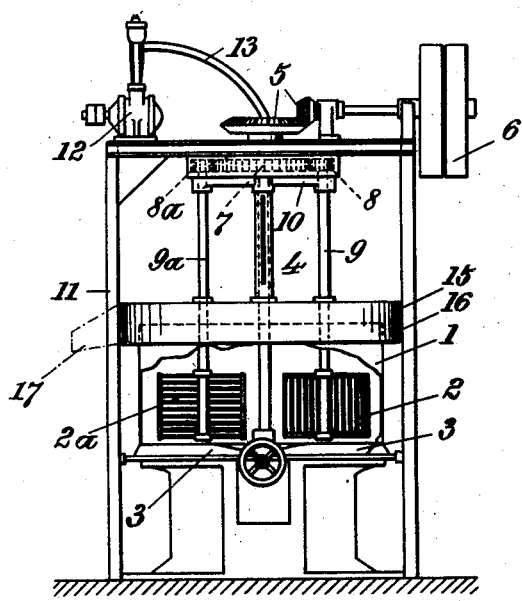

A represents the husking apparatus shown in detail in Figs. 2 to 4, to which the corn to be treated, for instance rye or wheat, is fed through a chute $a$ and the water required for loosening the husks from the kernel through a pipe $b$ and the water used for floating away the husks separated from the kernels through a pipe $c$, while the husks are conveyed away through a pipe $d$ and the husked kernels through a pipe $e$. To the pipe $d$ is connected an apparatus B in which a portion of the water is removed from the husks. In the case illustrated by the drawings this apparatus consists of a hollow cylinder $f$ with a perforated wall in which a worm $g$ rotates, which presses the wet husks coming from the apparatus A and conveys them to a chute $h$ in which the husks, after a portion of the water has been removed, slide down into the inlet end of a drum drier C. In front of the drier a device may be provided for separating the mass of husks which in the moist state stick together fairly firmly. The drier C is preferably a so-called trickling drier, that is to say, the material to be dried is fed on to sheet metal insertions, a great number of which are provided on the inside of the revolving drum wall and which during the rotary motion of the drum allow it to fall and carry it upwards again, the falling material being swept over by a stream of warm air passing through the drum in the longitudinal direction. The dried husks leave the drier at $i$ and thereupon join the stream of husks fed through the passage $k$ which will be described below and are delivered straight into sacks or may be compressed to as small a volume as possible in a device D constructed in the manner of a baling press so as to reduce the cost of transport.

The kernels which have been dehusked in the apparatus A are preferably first conveyed from the pipe $e$ into a centrifuge E in which a portion of the water adhering to them can be removed. The kernels may, however, be conveyed directly to a drier F connected to the centrifuge which may be constructed similarly to the already described drier C but must be of considerable larger dimensions as the quantity of material to be dealt with is considerably greater. In smaller plants the kernels and the husks may be dried in a single drier. In this case the husks are first passed through the drier and thereupon the kernels.

The air used for drying the kernels is drawn by suction through the drying drum by an exhaust fan G at a fairly high velocity so that the remaining husks, which still adhere to the kernels when they leave the dehusking apparatus A and which separate from the kernels when being dried in the drum F, will be carried along by it. These husks are mixed through the passage $k$ already referred to with the husks coming from the drier C and are conveyed along with them, for instance to the baling press.

The dried kernels leaving the drier F at 1 may be either delivered to sacks or be piled up for future grinding or sent to the mills or be immediately ground. The kernels may be ground as already stated by means of the usual sets of mill stones and roller mills with the difference that in the case of normal mills either individual sets of mill stones and roller mills are laid idle or that the material to be ground is passed not as heretofore successively through the different roller mills but simultaneously through several roller mills next to one another, that is to say in parallel arrangement.

The actual grinding is of course combined as usual with a sifting process whereby the different kinds of flour, fine flour, grits and the like, but no bran, are obtained. It is a noticeable fact that the ground material which has been preliminarily dried according to the present invention yields, even after passing through the first roller mill, over 70% of fine flour.

The construction of the dehusking device A is shown in Figs. 2 to 4. In a container 1 are provided two stirring or beating devices 2, 2$a$ which are rotatable about vertical axes and stirring arms 3 which are also rotatable about a vertical axis. The arms 3 which are preferably in the form of propeller blades are rotated by means of a vertical shaft 4 through bevel wheel gear 5 from a counter-shaft 6. A toothed wheel 7 mounted on the shaft 4 also drives two smaller toothed wheels 8, 8$a$ which are mounted on the shafts 9, 9$a$ which drive the beater devices 2, 2$a$. The shafts 9, 9$a$ are connected together by a cross piece 10 in such a manner that the toothed wheels 8, 8$a$ roll around a large toothed wheel 7 and that the beater devices 2, 2a, besides turning about their own axes also revolve about the axis of the central shaft 4.

The beater devices 2 and 2a consist suitably each of four blades formed by a grid of bars. The bars of the grids of one device are preferably arranged differently from those of the other device, the bars of the device 2 being for instance vertical while those of the device 2a are horizontal. The blades of the stirring device 3 preferably extend up to the wall of the container 1.

The container 1 is provided with a false perforated bottom 14. To the space below this false bottom a pipe 13 is connected which communicates with the fan 12 arranged at the top on the frame 11 of the apparatus. The container 1 has a separate rim 15 at its upper end, which surrounds the edge of the container at a certain distance, so that a gutter 16 extending around the edge of the container is formed, which is provided with an outflow 17. To this outflow is connected the pipe $d$ (Fig. 1) referred to above.

The corn to be dehusked is placed in the container 1 and the wetting water is then admitted. This water is preferably kept so warm that the mixture of water and corn has a temperature of about 60 to 65°. Through the raised temperature the separation of the outer husks from the kernels is considerably accelerated. The temperature of the water must, however, not be made too high as otherwise the kernels will be detrimentally affected. For starting the husking process a quantity of water will suffice with which the mass of corn in the stirring container is not even covered by water. The stirring means may be already put in operation while the water is being added. Their action causes a vigorous friction between the grains, and the beaters 2, 2a, more particularly have a direct rubbing action on the grains. Through the action of the beater devices and of the stirring blades 3 which cause the grains settling on the bottom of the container to be moved round again, the grains are agitated so violently as to cause them to be thoroughly cleaned by the particles of dirt adhering to the grains being rubbed off the outer husks to be loosened and in part separated from the kernels.

After the treatment has proceeded for only a few minutes (15 to 20 at the most), the loosening of the husks is substantially completed, so that the separation of a portion of the husks from the kernel can be proceeded with. This separation is effected by blowing air into the space below the perforated bottom 14 by means of the blower 12. This blowing in of air is preferably carried out after the wetting water has been let off and replaced by cold water which can be admitted through a pipe $c$ leading from below into the container 1. Through the air rising in the container 1 which causes a violent ebullition of the corn in the surrounding water, the husks loosened from the kernels are floated to the surface and washed over the edge of the container so that they pass into the gutter 16 surrounding the edge, from which they pass through the outflow 17. This operation is followed by the further treatment in the worm B and in the drier C already described.

After a portion of the husks (about one half) has been separated off in this way, the mass remaining in the container, which consists of the dehusked kernels and the husks not completely removed from the latter are further treated after the flushing water has been let off by the mass passing, with or without intermediate treatment in the centrifuge E (Fig. 1), into the drier F, where the kernels are dried, the remaining husks being at the same time removed.

The drying is suitably effected by warm air. The drying air which is driven through the drying drum by means of a blower should have a temperature of about 85°. In place of the dehusking device described above, another device may be used, which enables the outermost husks or cuticles of the corn, consisting almost completely of cellulose, to be separated from the husks with as little damage as possible to the kernel and to the husk. The other apparatus of the described plant can also be replaced by other ones, having the same or similar action. The husking apparatus described has proved particularly satisfactory as regards the effects referred to. Of particular importance for freeing the kernel as completely as possible from the outer husk is the treatment of the dehusked grains in a drier as described above, in which the drying or already dried grains are subjected to a strong current of air. Through this drying the husks which have not been separated off in the apparatus A and which remain adhering to the kernels owing to the moisture are loosened from the kernels and are separated from them finally by the stream of drying air. In this way it is possible to free the kernels practically completely from their husks and thus not only to increase the purity of the flour obtained from the kernels and further improve its colour, but also to increase the quantity of the separated husks.

These husks, on account of their great purity (they contain 97% of pure cellulose) can be used with advantage in the cellulose industry, more particularly as the raw material for the manufacture of celluloid and of artificial silk and the like. This provides a further source of raw material of very considerable importance, which is all the greater as the timber hitherto almost exclusively used by the cellulose industry is becoming scarcer and scarcer, so that a failure of this source of supply of raw material may be regarded as being already in view.

The dried husks can also be used with great advantage as a padding material. Their suitability for this purpose is due to the great elasticity of the husks which, when obtained by the new process, substantially retain their hollow form.

The improved baking property of the flour obtained by the new process has already been referred to. The flour and the baked articles made with it have a better taste and smell, which, apart from the greater content of the constituents of the outer layers of the kernel which are more valuable in this respect, are to be accounted for in the opinion of the inventor by the moistening prior to the dehusking and the subsequent drying at a raised temperature.

The main advantage of the new process consists in the extremely short time taken for the treatment. This time from the pouring of the grain into the wet husking vat to the moment when the grain leaves the drier ready for transport or storage amounts to barely ¾ of an hour. This is mainly due to the interruption of the wet husking operation, after only a very short steeping period and to the separation of the husks being completed simultaneously with the drying. A further important point is the avoidance of the disadvantages caused by the usual considerable softening of the corn by steeping, which disadvantages consist in the baking property of the obtained flour being detrimentally affected and in the re-drying of the softened kernels involving a considerable amount of drying work and also in the certain easily soluble nutritive salts being washed out of the kernels.

I claim:

1. A process for opening up cereals, especially bread cereals, consisting in vigorously agitating the cereal in warm water for a short time, so as to cause a considerable part of the outer ligneous husks to loosen from the kernels without swelling of the latter, removing the husks already separated from the kernels, drying the cereal and removing the remainder of the husks from the kernels.

2. A process for opening up cereals, especially bread cereals, consisting in agitating the cereal together with a relatively small quantity of water so long as to cause no swelling of the kernels and a considerable part of the husks still to adhere to the kernels, removing the husks already separated from the kernels, drying the cereal and removing the remainder of the husks from the kernels.

3. A process for opening up cereals, especially bread cereals, consisting in agitating the cereal together with a relatively small quantity of water so long as to cause no swelling of the kernels and a considerable part of the husks still to adhere to the kernels, removing the husks already separated from the kernels by floating away, the grains being at the same time washed, drying the cereal and removing the remainder of the husks from the kernels.

4. A process for opening up cereals, especially bread cereals, consisting in vigorously agitating the cereal in warm water for a short time, so as to cause a considerable part of the outer ligneous husks to loosen from the kernels without swelling of the latter, removing the husks already separated from the kernels, drying the cereal, and during drying separating the remainder of the husks from the kernels.

5. A process for opening up cereals, especially bread cereals, consisting in vigorously agitating the cereal in warm water for a short time so as to cause a considerable part of the outer ligneous husks to loosen from the kernels without swelling of the latter, removing the husks already separated from the kernels, drying the cereal, and then removing the remainder of the husks from the kernels.

6. A process for opening up cereals, especially bread cereals, consisting in vigorously agitating the cereal in warm water for a short time so as to cause only a part of the outer ligneous husks to loosen from the kernels, removing the husks already separated from the kernels by floating away, drying the cereal and separating the remainder of the husks from the kernels.

7. A process for opening up cereals, especially bread cereals, consisting in vigorously agitating the cereal in warm water for a short time so as to cause only a part of the outer ligneous husks to loosen from the kernels, removing the husks already separated from the kernels by floating away, drying the cereal, separating the remainder of the husks from the kernels and grinding the kernels.

8. A process for opening up cereals, especially bread cereals, consisting in vigorously agitating the cereal in warm water for a short time so as to cause only a part of the outer ligneous husks to loosen from the kernels, removing the husks already separated from the kernels by floating away, drying the cereal by agitating it in the presence of an air current, and removing the remainder of the husks by said air current.

9. A process for opening up cereals, especially bread cereals, consisting in vigorously agitating the cereal in warm water for about 15 to 20 minutes to cause only a part of the outer ligneous husks to loosen from the kernels, removing the husks already loosened from the kernels by being floated away, the grains being at the same time washed, drying the cereal and removing the remainder of the husks from the kernels.

10. A process for opening up cereals, especially bread cereals, consisting in vigorously agitating the cereal in warm water for about 15 to 20 minutes to cause only a part of the outer ligneous husks to loosen from the kernels, removing the husks already loosened from the kernels by being floated away, the grains being at the same time washed, drying the cereal, removing the remainder of the husks from the kernels and grinding the latter.

In testimony whereof I affix my signature.

PAUL GROSS.